Patented Oct. 8, 1935

2,016,572

UNITED STATES PATENT OFFICE 2,016,572

CHLORINATED ORGANIC COMPOUNDS CONTAINING SUBSTANTIAL AMOUNTS OF ACETYLENE TETRACHLORIDE

Paul Baumann, Ludwigshafen-on-the-Rhine, Robert Stadler, Ziegelhausen, and Erhard Willig, Ludwigshafen-on-the-Rhine, Germany, assignors to I. G. Farbenindustrie Aktiengesellschaft, Frankfort-on-the-Main, Germany No Drawing. Application July 18, 1932, Serial No. 623,292. In Germany July 22, 1931

11 Claims. (Cl. 260—166)

The present invention relates to the production of acetylene chlorides, more particularly acetylene tetrachloride.

It is already known that acetylene chlorides, in particular acetylene tetrachloride, may be prepared by the direct union of acetylene with chlorine. For this purpose acetylene prepared from carbides has hitherto always been employed; this acetylene is obtained in a practically pure form and contaminated with only very small amounts of substances which are not injurious during the chlorination.

We have now found that instead of acetylene obtained from carbides such as has hitherto been employed, the gas mixtures produced during the preparation of acetylene by thermal dissociation, which expression for the purpose of the present invention is to include the simple splitting at temperatures above 800° C., and in particular the treatment in the electric arc, of gaseous or vaporous or dispersed liquid or solid hydrocarbon products, may be successfully converted into acetylene tetrachloride by treatment with chlorine at a temperature above 80° C. and below the boiling point of acetylene tetrachloride. The said gaseous or vaporous or dispersed liquid or solid hydrocarbon products are hereinafter referred to as vaporized hydrocarbon products. As such vaporized hydrocarbon products come into question gases containing or consisting of hydrocarbons of any kind, as for example natural gases or other industrial gases, or vaporized hydrocarbon oils or tars in the form of mist or dispersions of fine coal dust or similar materials. In the said gas mixtures the acetylene is strongly diluted with hydrogen, the non-converted initial gases and sometimes also with nitrogen. Moreover, the said gas mixtures contain as impurities ethylene, diacetylene, allylene, allene and hydrocyanic acid, in some cases in considerable amounts. The gas mixtures, in the form in which they are obtained, may be directly exposed to the action of chlorine, but, if desired, an enrichment in acetylene, for example by washing out the gas mixtures with acetone and expelling the absorbed gases, may be carried out previously. In the latter case, the hydrocarbons contained in the gas mixtures as impurities, in so far as they have unsaturated character, are also enriched. For the chlorination it is preferable to work at temperatures from 100° to about 130° C. At temperatures above 100° C. the speed of reaction is so great that by a single passage through the chlorination apparatus the acetylene content is reduced for example from 16 per cent to less than 1 per cent. Practically no conversion of the hydrogen contained in the gas mixture takes place. Moreover, by working with chlorine in excess over the amount stoichiometrically required for the conversion of acetylene into acetylene tetrachloride, there is practically no formation of hexachlorethane, which in some cases may be undesirable. For example it is advantageous to work with an excess of about 5 per cent over the said amount. In order to obtain as complete a chlorination as possible of the acetylene contained in the gas mixtures, it is preferable, especially when working with gas mixtures which have not been enriched, to employ the gas mixtures in a preheated state, preferably at a temperature employed for the reaction or near the reaction temperature. The preheating is advantageously carried out while employing tubes lined with aluminum whereby the formation of polymerization products of acetylene or diacetylene is prevented. The heat set free during the chlorination may be utilized for preheating.

The process according to the present invention may be effected at reduced, ordinary or elevated pressures. The pressure, of course, should not be chosen so high that there is any danger of the explosion of the acetylene.

The following examples will further illustrate the nature of this invention but the invention is not restricted to these examples.

Example 1

2.70 cubic metres per hour of chlorine and 7.95 cubic metres per hour of dried acetylene-containing gas (prepared from methane in the electric arc) in an impure state and preheated to about 100° C. are led into the lower part of an iron reaction tower of 200 millimetres diameter and 2500 millimetres length continuously. The tower is filled with silica bricks and pieces of wrought iron and is continuously trickled with acetylene tetrachloride. The iron may be replaced by other chlorine carriers, such as phosphorus pentachloride or antimony pentachloride. The gas led in has the following composition:—

| | Per cent |
|---|---|
| $C_2H_2$ | 12.9 |
| $C_4H_2$ | 1.5 |
| $C_3H_4$ | 0.3 |
| $C_2H_4$ | 0.8 |
| $O_2$ | 0.2 |
| CO | 0.4 |
| $H_2$ | 57.7 |
| $CH_4$ | 23.4 |
| $N_2$ | 2.7 |

The working temperature is 110° C. A part of the acetylene tetrachloride supplied to the tower is continuously withdrawn together with the acetylene chlorides formed. The liquid obtained has a specific gravity of 1.61. It consists to the extent of 90 per cent of acetylene tetrachloride, about 3 per cent of chlorinated hydrocarbons boiling below 144° C. and 7 per cent of those boiling above 148° C. In the last fractions, there are up to 4 per cent of solid organic chloride compounds (calculated with reference to the amount subjected to distillation). The gas leaving the reaction tower, after absorption of the chlorine, has the following composition:—

| | Per cent |
|---|---|
| $C_2H_2$ | 1.6 |
| $C_4H_2$ } | Traces |
| $C_3H_4$ } | |
| $O_2$ | 0.2 |
| CO | 0.3 |
| $CH_4$ | 27.4 |
| $N_2$ | 3.0 |
| $H_2$ | 67.5 |

*Example 2*

0.9 cubic metre per hour of electric arc gas, in which the acetylene has been enriched by treating the dilute gas with acetone and expelling the absorbed gas, and 2 cubic metres per hour of chlorine are treated in the reaction tower described in Example 1. The acetylene-containing gas mixture employed has the following composition: 82 per cent of $C_2H_2$, 7 per cent of $C_4H_2$, 1 per cent of $C_3H_4$, 6 per cent of $C_2H_4$, 2 per cent of $CH_4$ and 2 per cent of $N_2$. From about 8 to 10 per cent of the unsaturated hydrocarbons supplied to the tower leave the same unchanged. In each hour, about 3.6 litres of liquid chlorination products having a specific gravity of 1.60 are obtained, their composition being similar to that specified in Example 1.

What we claim is:—

1. A process for producing acetylene tetrachloride comprising subjecting a gas mixture obtained by the electric arc treatment of a vaporized hydrocarbon and containing acetylene with other triple bond hydrocarbons to the action of chlorine at a temperature of from 80° C. to that of the boiling point of acetylene tetrachloride.

2. A process as defined in claim 1 wherein the preheating is effected in a passage confined by walls of aluminium.

3. A process for producing acetylene tetrachloride comprising subjecting a gas mixture obtained by the electric arc treatment of a vaporized hydrocarbon and containing acetylene with other triple bond hydrocarbons to the action of chlorine at a temperature of from 100° C. to that of the boiling point of acetylene tetrachloride.

4. A proces for producing acetylene tetrachloride comprising subjecing a gas mixture obtained by the electric arc treatment of a vaporized hydrocarbon and containing acetylene with other triple bond hydrocarbons to the action of chlorine at a temperature of from 100° to 130° C.

5. A process for producing acetylene tetrachloride comprising bringing chlorine and a gas mixture obtained by the electric arc treatment of a vaporized hydrocarbon and containing acetylene with other triple bond hydrocarbons to a temperature approximating one in the range of 80° C. to that of the boiling point of acetylene tetrachloride, and then allowing these gases to react upon each other at a temperature of from 80° C. to that of the boiling point of acetylene tetrachloride.

6. A process for producing acetylene tetrachloride comprising preheating a gas mixture obtained by the electric arc treatment of a vaporized hydrocarbon and containing acetylene with other triple bond hydrocarbons to a temperature approximating one in the range of 80° C. to that of the boiling point of acetylene tetrachloride and subjecting said preheated mixture at a temperature of the said range to the action of an excess of chlorine over the amount stoichiometrically required for the conversion of acetylene into acetylene tetrachloride.

7. A process for producing acetylene tetrachloride comprising preheating a gas mixture obtained by the electric arc treatment of a vaporized hydrocarbon and containing acetylene with other triple bond hydrocarbons to a temperature approximating one in the range of 100° C. to that of the boiling point of acetylene tetrachloride and subjecting said preheated mixture at a temperature of the said range to the action of an excess of chlorine of about 5 per cent over the amount stoichiometrically required for the conversion of acetylene into acetylene tetrachloride.

8. A process for producing acetylene tetrachloride comprising subjecting a gas mixture obtained by the electric arc treatment of a vaporized hydrocarbon and containing acetylene with other triple bond hydrocarbons to the action of chlorine at a temperature of from 80° C. to that of the boiling point of acetylene tetrachloride, at an elevated pressure below the explosive point of acetylene under the conditions of the chlorinating reaction.

9. A process for producing acetylene tetrachloride comprising subjecting a gas mixture obtained by the electric arc treatment of a vaporized hydrocarbon and containing acetylene with other triple bond hydrocarbons to the action of chlorine at a temperature of from 80° C. to that of the boiling point of acetylene tetrachloride, and in the presence of acetylene tetrachloride as a diluent.

10. A process for producing acetylene tetrachloride comprising bringing chlorine and a gas mixture obtained by the electric arc treatment of a vaporized hydrocarbon and containing acetylene with other triple bond hydrocarbons to a temperature approximating one in the range of 80° C. to that of the boiling point of acetylene tetrachloride, and then allowing these gases to react upon each other at a temperature of from 80° C. to that of the boiling point of acetylene tetrachloride, at an elevated pressure below the explosion point of acetylene under the conditions of the chlorinating reaction.

11. A process for producing acetylene tetrachloride comprising bringing chlorine and a gas mixture obtained by the electric arc treatment of a vaporized hydrocarbon and containing acetylene with other triple bond hydrocarbons to a temperature approximating one in the range of 80° C. to that of the boiling point of acetylene tetrachloride, and then allowing these gases to react upon each other at a temperature of from 80° C. to that of the boiling point of acetylene tetrachloride, and in the presence of acetylene tetrachloride as a diluent.

PAUL BAUMANN.
ROBERT STADLER.
ERHARD WILLIG.